United States Patent [19]

Rynbrandt

[11] 4,398,527

[45] Aug. 16, 1983

[54] INTERNAL COMBUSTION ENGINE HAVING MANIFOLD AND COMBUSTION SURFACES COATED WITH A FOAM

[75] Inventor: Jay D. Rynbrandt, San Rafael, Calif.

[73] Assignee: Chevron Research Company, San Francisco, Calif.

[21] Appl. No.: 278,012

[22] Filed: Jul. 1, 1981

Related U.S. Application Data

[63] Continuation-in-part of Ser. No. 180,190, Aug. 22, 1980, abandoned, and a continuation-in-part of Ser. No. 205,535, Nov. 10, 1980, abandoned.

[51] Int. Cl.$^3$ ............................................. F02B 75/08
[52] U.S. Cl. ............................. 123/668; 123/193 CH; 123/193 P; 123/188 AA; 123/193 H; 123/193 C; 428/308.4
[58] Field of Search ........ 123/193 H, 193 CH, 193 R, 123/668, 193 C, 669, 193 P, 188 AA; 60/272, 282; 428/306, 308, 313

[56] References Cited

U.S. PATENT DOCUMENTS

| 2,151,428 | 3/1939 | Janeway | 123/41.71 |
|---|---|---|---|
| 2,748,757 | 6/1956 | Morris | 123/41.72 |
| 3,019,277 | 1/1962 | Rudy | 123/668 |
| 3,060,915 | 10/1962 | Cole | 123/59 A |
| 3,066,663 | 12/1962 | Rudy | 123/668 |
| 3,171,253 | 3/1965 | Milliken | 123/41.72 |
| 3,190,856 | 6/1965 | Lavin | 528/229 |
| 3,321,414 | 5/1967 | Vieil | 428/319.1 |
| 3,347,808 | 10/1967 | Lavin | 428/428 |
| 3,408,995 | 11/1968 | Johnson | 123/668 |
| 3,459,167 | 8/1969 | Briggs | 123/669 |
| 3,470,117 | 9/1969 | Pearce | 428/310.5 |
| 3,552,370 | 1/1971 | Briggs | 123/669 |
| 3,651,182 | 3/1972 | Rosenthal | 428/315.5 |
| 3,709,772 | 1/1973 | Rice | 428/312.6 |
| 3,820,523 | 6/1974 | Showalter | 123/669 |
| 3,855,986 | 12/1974 | Wiss | 123/668 |
| 3,877,126 | 4/1975 | Deutschmann et al. | 123/669 |
| 3,911,891 | 10/1975 | Dowell | 123/669 |
| 3,919,755 | 11/1975 | Kaneko et al. | 428/312.8 |
| 4,067,670 | 1/1978 | Goloff | 123/669 |
| 4,074,671 | 2/1978 | Pennila | 123/668 |
| 4,075,999 | 2/1978 | Dennis | 123/668 |
| 4,148,352 | 4/1979 | Sensui et al. | 164/112 |
| 4,256,803 | 3/1981 | Savey et al. | 428/313.5 |

FOREIGN PATENT DOCUMENTS 2602434 7/1977 Fed. Rep. of Germany ........ 60/282

OTHER PUBLICATIONS

Netting; Syntactic Foam; Modern Plastics Encyclopedia 1978-1979; p. 145.
Koton; High-Temperature Polymers Containing Cyclic Functions; Advances in Macromolecular Chemistry-vol. 2, 1970; pp. 175-236.
Reccmia et al; Thermoplastic Polyimide; Modern Plastics Encyclopedia 1979-1980; pp. 76-79.
Adrova et al; Polyimides-A New Class of Thermally Stable Polymers; 1970; pp. 151-201.

Primary Examiner—Craig R. Feinberg
Attorney, Agent, or Firm—D. A. Newell; J. M. Whitney; Q. T. Dickinson

[57] ABSTRACT

For the more efficient operation of both spark- and compression-ignited internal combustion engines, and/or control of octane requirement increase in spark-ignited internal combustion engines, at least a portion of the surfaces of the intake manifold exposed to the fuel-air mixture, and/or the combustion chamber exposed to combustion, are fabricated from coated with a material having the combination of thermal conductance and thermal penetration which permits the temperature of said surface during the combustion process to be in excess of the temperature at which deposits form and said surface storing insufficient heat to substantially raise the temperature of the incoming air-fuel charge during the engine intake and compression stroke.

11 Claims, 2 Drawing Figures

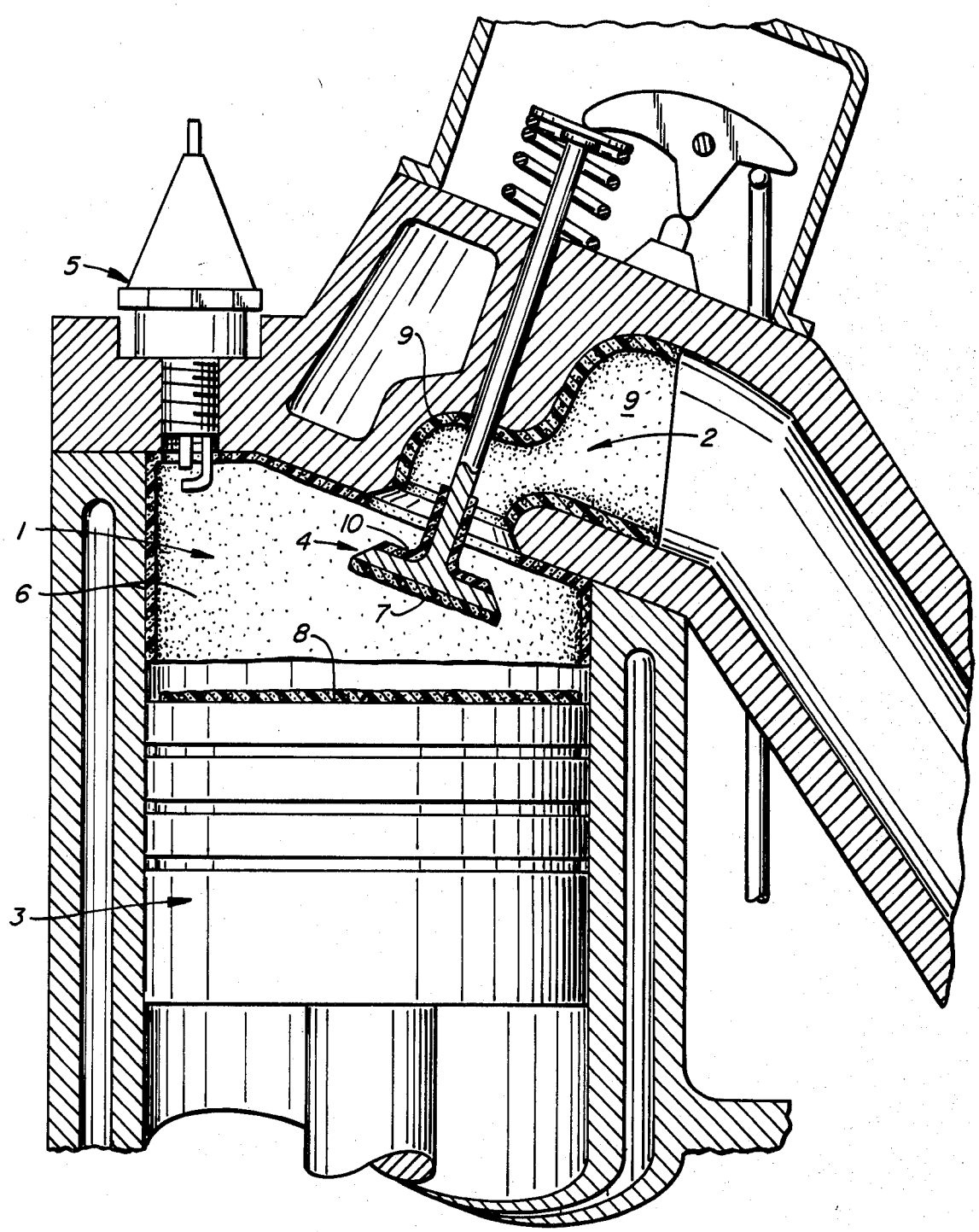
FIG._1.
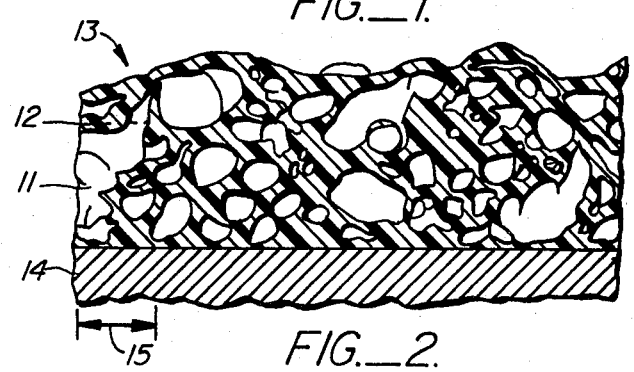
FIG._2.

INTERNAL COMBUSTION ENGINE HAVING MANIFOLD AND COMBUSTION SURFACES COATED WITH A FOAM

CROSS-REFERENCE TO RELATED APPLICATIONS

This application is a continuation-in-part of Ser. No. 180,190, filed Aug. 22, 1980, and a continuation-in-part of Ser. No. 205,535, filed Nov. 10, 1980, both of which are now abandoned.

BACKGROUND OF THE INVENTION

This invention relates to internal combustion engines, both spark ignition (SI) internal combustion (IC) engines, and compression ignition (CI) internal combustion engines such as diesel engines. It also relates to the coating of the internal surfaces of internal combustion engines, in particular, it relates to the coating of the unwiped surface of a combustion chamber exposed to combustion gases, the intake valves, the surface of the intake manifold exposed to fuel-air mixtures, and the surface of the exhaust manifold exposed to exhaust gases.

It has been recognized that the thermal efficiency of the internal combustion engine could be improved by coating the aforementioned combustion chamber surfaces with a thermally insulating coating to reduce heat losses to the coolant during the compression and power cycles (fully 30–40% of the total heat generated in an IC engine is lost to the coolant). U.S. Pat. Nos. 4,074,671 and 3,820,523 provide a thin ceramic coating of the combustion chamber surface for this purpose. U.S. Pat. Nos. 3,911,891 and 3,552,370 provide for the deposition of layers of certain materials for the same purpose.

U.S. Pat. Nos. 3,066,663 and 3,019,277 teach the coating of certain combustion chamber surfaces with a ceramic insulation of appropriate thickness and thermal conductivity purportedly to avoid the formation of surface-ignition and rumble-causing deposits when a fuel or lubricant containing phosphorous is used in a high compression engine.

The deposition of substances on combustion chamber surfaces is believed to lead to an increase in the octane requirement of new spark ignited engines as they operate on unleaded fuels due to increased compression ratio and heat regenerated to the fresh air-fuel charge. Octane requirement increase, ORI, in such a case can be as much as six or more octane numbers. The "octane requirement" is the minimum octane necessary to avoid noticeable knock. Avoidance of ORI would permit the use of higher compression ratios for greater efficiency and/or the use of lower octane unleaded fuel.

A thermal insulating coating on the piston top surface would also tend to reduce the heat loading of the piston. This in turn would reduce the rate of deposit formation in the ring belt zone thereby reducing ringsticking.

Insulated intake manifolds and intake valves decrease heating of the intake air-fuel charge in SI engines, which reduces their octane requirement, and decreases intake air heating in CI engines, which improves their volumetric efficiency.

Insulated exhaust manifolds increase the heat available to turbo-charge CI and SI engines and increase the temperature of exhaust gases at the catalyst in SI engines.

A low heat capacity, insulating coating on the piston top surface and combustion chamber surfaces reduces the thickness of the non-burning quench layer near these surfaces and improves volatilization during combustion of any hydrocarbon liquids which are on the surfaces. These two processes promote hydrocarbon burning and reduce hydrocarbon exhaust emissions.

SUMMARY OF THE INVENTION

Internal combustion engines in general can be operated more efficiently, and spark-ignited engines, in particular, can be operated on unleaded fuel of lower octane without knocking, if in an internal combustion engine comprising a combustion chamber having a surface exposed to combustion. At least a portion of said surface has a combination of thermal conductance and thermal penetration which permits the temperature of said surface during the combustion process to be in excess of the temperature at which deposits form and said portion of said surface stores insufficient heat to substantially raise the temperature of the incoming air-fuel charge during the engine intake and compression stroke.

BRIEF DESCRIPTION OF THE DRAWINGS

FIG. 1 is a fragmentary vertical sectional view showing a portion of an engine employing some coatings of the present invention.

FIG. 2 is a cross-sectional schematic drawing of a coating made from a scanning electron micrograph of the coating of this invention after cutting said coating in a direction perpendicular to the surface and viewing same in a direction parallel to said surface.

DESCRIPTION OF THE PREFERRED EMBODIMENTS

The present invention may be used in any internal combustion engine and particularly the common reciprocating-piston internal combustion engine. FIG. 1 illustrates an embodiment of the invention wherein a coating of a material having the required thermal penetration and thermal conductance is applied to the surfaces of a conventional combustion chamber 1 and intake manifold 2 of a 4-cycle engine. The piston 3 and intake valve 4 are shown in approximate relative position early in the intake-downstroke of the piston. The fuel-air mixture (not shown) passes through the intake manifold 2, past the opened intake valve 4 and into the combustion chamber 1 where it will eventually be ignited by the spark plug 5. In accordance with the present invention, at least a portion of one or more of the combustion chamber surfaces, the intake valve, the exhaust and intake manifold surfaces are coated with a material having the recited thermal parameters such as a thermally-stable, resinous closed-cell foam of about 0.02 mm to about 1 mm thickness and preferably, 0.04 mm to 0.2 mm. In the illustration of FIG. 1, at least a portion of the unwiped surface of the combustion chamber 6-8 is coated, in particular, the unwiped portion of the cylinder head 6, the face of the intake valve 7, and the piston top surface 8 (i.e., the portion exposed to combustion), and at least a portion of the intake manifold surface 9-10 is also coated, in particular, the intake manifold chamber 9 and the tulip portion of the intake valve 10, which, for convenience, is considered part of the intake manifold surface.

FIG. 2 schematically illustrates a particular embodiment of the coated surface of the present invention in close-up cross-sectional view. FIG. 2 is drawn from an actual scanning electron micrograph of a resinous closed-cell foam coating of this invention having the required thermal parameters. The coating was cut in a direction perpendicular to the surface and is viewed parallel to that surface. In FIG. 2, hollow microspheres 11 in a resinous matrix 12 provide a closed-cell foam coating 13 on the surface 14. The dimension of 100 microns is indicated 15. The microspheres 11 contain a gas (not shown) which may be air.

The closed-cell material of the present invention is a unique material of low heat capacity. The material can be an integral part of the combustion chamber surface fabricated during the manufacturing process or applied as a surface coating to finished combustion chamber parts as illustrated by FIG. 1.

The required thermal conductivity and heat capacity closed-cell materials of the invention can be defined by the mathematical models for thermally oscillating systems such as the combustion chamber surface of an internal combustion engine.

The requirements for the materials suitable for use in the invention are expressed in terms of thermal penetration and thermal conductance. A combustion chamber with a coating of low thermal penetration and high thermal conductance regenerates less heat to the fresh air-fuel charge than one with conventional deposits, formed from unleaded or leaded gasoline; and thus, it has a lower octane requirement than a chamber with these conventional deposits. During at least part of the combustion process, the surface temperature of the combustion chamber becomes high enough to prevent formation of conventional deposits. Computer models suggest that thin coatings or a surface region with high closed-cell void volumes on combustion chambers may approach the low regenerated heat of a clean metal combustion chamber and still attain sufficient surface temperature during combustion to prevent conventional deposits from forming. Reduction of regenerated heat is observed in computer models upon reduction of thermal penetration and upon increase of thermal conduction. Simultaneous reduction of thermal penetration and increase of thermal conduction is more beneficial than changing of either property separately. Thermal penetration has no lower limit of beneficial affect. The upper limit to thermal conductance usefulness is that point at which the surface no longer becomes hot enough during combustion to prevent the build-up of deposits which eliminate the ORI control advantage of the coating. This upper limit is lower for higher values of thermal penetration. Thermal penetration is defined as $\sqrt{K\rho C}$, where K is thermal conductivity, $\rho$ is density, and C is heat capacity. Thermal conductance is defined as K/d where d is thickness. Closed-cell materials of the present invention have a thermal penetration, in SI units, of less than about 600 $J/m^2°Ksec^{1/2}$ and a thermal conductance of at least about 2000 $J/m^2°Ksec$. Suitable materials will have thermal penetration times thermal conductance of less than about $3 \times 10^6$ $J^2/m^4°K^2sec^{3/2}$. In addition, the heat storages of the surface should be insufficient to raise the temperature of the incoming air-fuel charge more than about 33° C. above the temperature increase of clean engine. Preferred coatings, such as a closed-cell polyimide resinous foam containing carbon black and microspheres, have a thermal penetration of about 380 $J/m^2°Ksec^{1/2}$ and a thermal conductance of 3000 $J/m^2°Ksec$.

The material can be any solid inorganic or organic material or modified materials thereof having sufficient void volume therein to fall within the recited parameters. Suitable organic materials are high temperature polyimide resins and resinous foams incorporating microspheres. Suitable inorganic materials are materials such as the oxides, nitrides, and carbides of Si, Ti, Cr, Ta, Nb, Zn, and the like, which have been modified by the incorporation of a sufficient void volume, i.e., microspheres, blowing agents, or gases, and the like, to come within the recited thermal conductance and thermal penetration parameters. The thermal properties of a foam with a given non-void volume (NV) can be estimated from the following relationships:

$K \sim K_s*NV/(2-NV)$
$\rho = \rho_s*NV$
$C = C_s$ where the subscript s designates the thermal property of the solid.

One can quickly determine a desired value for NV by substituting the K, $\rho$ and C expressions for the foam into the formula for thermal penetration and adjusting the value of NV until the desired thermal penetration value is attained. The thickness of the coating, d, may be adjusted to bring the thermal conductance within the desired limits. For example, silicon nitride has K of 18 $W/m°k$, $\rho$ of 3240 $kg/m^3$ and C of 1060 $J/kg°k$. A foam of silicon nitride with NV of 0.08 would have an estimated K of 0.75 $W/m°k$ and an estimated thermal penetration of 454 $J/m^2°ksec^{1/2}$. A 0.2 mm thick coating of this foam would have a thermal conductance of 3750 $W/m^2°k$.

The modified inorganic composites can be formed by mixing organic or inorganic microspheres with the inorganic material and hot pressing or scintering the material to a solid or by other methods known in the art.

The surface coating functions in the combustion chamber to prevent heat loss, to prevent the permanent deposition of substances having higher heat capacity than the coating, and to promote combustion of hydrocarbons in the quench zone adjacent to the coating's free surface. It functions in the intake manifold, including the tulip portion of the intake valve, to prevent the excessive heating of the fuel-air charge (i.e., heating over that necessary for volatilization). Within the combustion chamber the deposit precursors are volatilized by the high temperature at the free surface of the coating during the power cycle. High surface temperatures of the coating are achieved by the selection of a coating having low heat capacity.

The coating of the present invention finds use in internal combustion engines of the spark ignition and compression ignition type, such as two- or four-cycle engines, as well as rotary piston engines commonly called "Wankel" engines. The surfaces which may be coated in the internal combustion engine consist of at least a portion of the combustion chamber surface, meaning the unwiped surface which is in contact with combustion gases and including the piston top surface (i.e., the portion exposed to combustion), valve face and cylinder head; and/or intake manifold surface, meaning the surface which contacts the incoming fuel-air charge between the carburetor and the combustion chamber and including the intake valve tulip. The coating is applied by any suitable method to form a substantially uniform layer which adheres to the surface, or to a suitably prepared surface, and has a thickness of about 0.02 mm to 1 mm, preferably about 0.2 mm to 0.04 mm, and most preferably about 0.03 mm to about 0.15 mm, for surfaces exposed to combustion. The thermal properties of the coating are such that it is durable, has low heat capacity, and is harmless to the engine, as well as, having substantial thermal stability.

At least a portion of some of the aforementioned surfaces are coated with the organic or inorganic foam. Preferably, a portion of the combustion chamber, more particularly, the cylinder head, which is in contact with the combustion gases, is coated. The piston top surface (i.e., the combustion face of the piston) is also a preferred surface for coating. The valve faces which are exposed to combustion may be coated, especially the intake valve. The surface of the intake manifold which contacts the incoming fuel-air mixture between the carburetor and the combustion chamber may be coated with resinous foam, preferably those portions of the intake manifold surface which have the highest temperature due to proximity to the combustion chamber, and more particularly, the tulip portion of the intake valve. Either, or both, the combustion chamber and the intake manifold surfaces are coated, at least in part, in the aforementioned manner, but for different reasons. While the combustion chamber is coated to provide more adiabatic-like operation of the engine, i.e., reducing heat loss to the coolant at the end of the compression stroke and throughout the power stroke, as well as to reduce deposition and heat regeneration; the intake manifold is coated to avoid excessive heating of the fuel-air charge over that necessary for volatilization of the mixture, as well as, to reduce deposit build-up around the tulip of the intake valve. Manifold coating is more applicable to carbureted engines than to those using in-cylinder fuel injection.

In another embodiment of this invention at least a portion of the exhaust port surface area is coated with said organic or inorganic foam to insulate the exhaust gases, thereby helping to keep the exhaust temperature higher for use by a turbocharger, or for improved catalytic emissions control.

The thermally-stable, closed-cell material coating of the present invention resists oxidation and decomposition even at the high surface temperatures to which it is intermittently exposed in internal combustion engines (e.g., about 400° C. and above). It owes its properties both to the materials from which it is constructed and to its manner of construction. The coating consists of a large number of voids embedded in a resinous matrix or inorganic material previously recited. In particular, the void spaces comprise about 40 or more volume percent of the coating. The coating is accurately termed a "foam" because of the large number of voids (actually gascontaining cells) contained therein. The voids are substantially sealed, i.e., the foam is a closed-cell foam, so that the pressure within a given closed-cell does not fluctuate with engine pressure cycles. A relatively simple manner of constructing the closed-cell foam coating of the present invention is to embed a large number of preformed hollow spheres, heretofore and hereinafter called "microspheres," in a resinous matrix, such a foam is called a "syntatic foam" (Modern Plastics Encyclopedia 1978-79, McGraw-Hill, page 145).

The microspheres are mixed into the resin solution which is later cured to a rigid matrix on the surface. Commercially available microspheres can be made from a wide variety of inorganic and organic materials, and mixtures thereof. Suitable inorganic microspheres are selected from the group consisting of glass, ceramic, and quartz microspheres, and mixtures thereof. Suitable organic microspheres are phenol-formaldehyde plastic microspheres, and like materials. The inorganic microspheres are of about 0.01 mm to 0.2 mm average diameter and are preferably present in an amount of from about 40 to about 80 volume percent of cured foam, and preferably from about 50 to about 65 volume percent. Organic microspheres are preferably of about 0.01 mm to 0.1 mm average diameter and are preferably present in an amount of from about 50 to about 70 volume percent of cured foam. The plastic microspheres are classified according to pressure tolerance by pressurizing the spheres to approximately 2,750 kilo Pascals, (k Pa), in liquid followed by flotation of the desired fraction. Inorganic microspheres are used to add strength in addition to void volume to the closed-cell foam. The inorganic microspheres are present in an amount of from about 40 to 70 volume percent of the cured foam. The microspheres are pressurized to about 12,000k Pa prior to flotation.

The organic resinous matrix material finding use within the scope of the present invention is any resin which sets to a rigid matrix having the properties of durability and thermal stability heretofore described. Resinous composites containing resin, carbon, and/or silica are preferred. Many such resins are high-temperature polymers containing aromatic rings (Advances in Macromolecular Chemistry, Vol. 2, Academic Press, New York, 1970, pages 175-236, M. M. Koton), fluorinated polymers or organo-silicon polymers; e.g., polyaromatics, polyphenylene oxides; aromatic polyesters, polyamides, polyanhydrides and polyureas having melting points greater than 300° C. are known. Preferably, the resin is a thermoset or thermoplastic polyimide or polyamide resin, such as the aromatic polymers that cure to form poly(amideimides), U.S. Pat. No. 3,190,856, e.g., polymers of trimellitic anhydride and aromatic diamines disclosed in U.S. Pat. Nos. 4,136,085 and 3,347,808. Polyimide resins are widely available (Modern Plastics Encyclopedia 1979-80, McGraw-Hill, pages 76-78). Thermoset polyimides exhibit no distinct softening point below their thermal degradation temperature which can be as high as 260° C., or higher. Thermoplastic polyimide has a melting point of about 310°-365° C. Polyimides are generally produced by the reaction of anhydrides or dianhydrides with di(-primary)amines (Polyimides a New Class of Thermally-stable Polymers, Technomic Publ. Co., Stamford, Conn., 1970, N. A. Adrova et al.), e.g., the reaction of

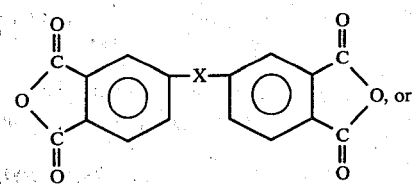

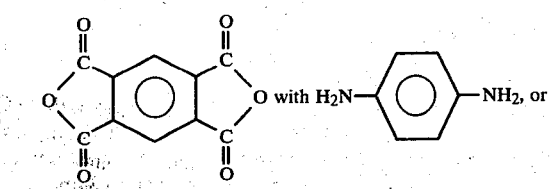

-continued

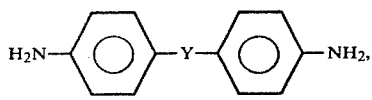

wherein —X— and —Y— are selected from

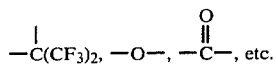

In a preferred embodiment, the resinous matrix is a composite of polyimide and carbon black or graphite, preferably, also containing other fillers such as the powdered forms of boron, ZnO, Al, and amorphous fumed silica. Preferably, a dense carbon black of low-surface area to volume ratio is used. Such composites are structurally more rigid and are more refractory, in that they retain their shape and durability even above the softening point of the resin. A preferred composite resinous matrix comprises about 30 to 85 weight percent of polyimide resin, 70 to 15 weight percent carbon black, and 0 to 7 weight percent of fumed silica. More preferably, with plastic microspheres, the composite resinous matrix comprises about 35 to 50 weight percent of polyimide, about 65 to 50 weight percent carbon black, and 0 to 4 weight percent fumed silica. A preferred closed-cell foam composition with inorganic microspheres is from about 60 to about 80 weight percent polyimide resin and about 40 to about 20 weight percent carbon black.

The foam coating may be formed on the metallic surface (it is recognized that plastic surfaces may be substituted, in certain instances, for metallic, if the internal combustion engine is constructed in part from plastic parts) by mixing polyimide with a solvent (i.e., 1-methyl-2-pyrrolidone) and optionally a diluent such as p-xylene, a filler, such as carbon black, graphite and/or fumed silica and/or boron powder, and microspheres. This liquid mixture is coated or sprayed onto the clean surface to the desired thickness. The surface may be heated before spraying. The diluent and solvent are carefully removed from the coating to control or prevent solvent gradients in the coating. The coating is cured by heating from about 140° C. to about 260° to 370° C. in an 8–24 hour curing process. The maximum practical curing temperature may be limited by the nature of the microspheres, since the phenolic microspheres are weakened at the highest temperature. The coating is generally applied to the surface in the thickness which is desired for continual use in the engine. However, while the coating need not be an ablative coating, if it is too thick, it may ablate back to a more preferred thickness in the range of about 0.04 mm to 0.2 mm for surfaces exposed to combustion.

The invention will be further illustrated by the following examples, but it is to be understood that the invention is not meant to be limited solely to the details described therein. Modifications which would be obvious to one of ordinary skill in the art are contemplated to be within the scope of the invention.

EXAMPLE 1

In this example a CFR L-head (single cylinder IC engine of 37.3 cu. in. displacement and 7.0:1 compression ratio) combustion chamber surface was coated with a mixture prepared by blending 1 volume part Amoco AI-10 amideimide polymer (a condensation polymer containing aromatic imide linkages and made from trimellitic anhydride and diamine), 3 volume parts N-methyl-2-pyrrolidone (NMP) and 1 volume part Cabot Sterling MT (medium thermal) carbon black in a high-speed blender until smooth; 3 dry volumes of Union Carbide BJO-0930 (phenolic resin) microballoons were added and stirred until smooth. The mixture was painted onto the combustion surface, heated with a hot air gun until set, then oven dried overnight at 60° C. and cured at 200° C., 230° C., 260° C., 290° C. and 315° C. for 2 hours each, respectively. This coating finished a 65-hour CFR engine test with unleaded gasoline (alkylate) at 1200 rpm, 4 in. Hg of intake vacuum and 1.5 ppm of exhaust CO and 20 degrees of spark advance, with no evidence of deterioration.

EXAMPLE 2

In this example another CFR L-head combustion chamber was coated with a mixture prepared by blending 24 grams of Monsanto Skybond 700 polyimide a heat reactive aromatic resin which is thermally cured to a crosslinked polyimide, 24 grams of Cities Service Columbian Raven MT (medium thermal) carbon black, 12 grams N-methyl-2-pyrrolidone, and 10 grams p-xylene in a high-speed blender. Seventy cc of Union Carbide BJO-0840 (phenolic resin) microballoons were added to 62 grams of the above blend along with 5 grams p-xylene diluent. The microballoons were prepared by pressuring them to 300 psi in isooctane then floating off the uncrushed fraction. The diluted coating was sprayed onto a cylinder heat preheated to 50° C. through an air-atomizing spray nozzle, air dried overnight to remove the bulk of the solvent, then oven dried at 50° C., 75° C., 100° C., and 180° C. for 2 hours each and cured at 200° C., 220° C., 240° C., and 260° C. for 2 hours each. This coating completed a 100-hour CFR engine test under the conditions of Example 1 with no evidence of deterioration.

EXAMPLE 3

A CFR L-head combustion chamber was coated with a mixture prepared by blending 25 grams Monsanto Skybond 700 heat reactive aromatic resin system which can be thermally cured to a crosslinked polyimide, 13 grams NMP, 15 grams Cities Service Columbian Raven MT thermal process carbon black beads until smooth in a high-speed blender. 2.6 grams of Union Carbide BJO 0930 microballoons, classified by discarding the floaters in a downward flowing column of ethanol, were added to 41 grams of the polyimide-carbon black matrix blend. This coating was dried and cured in the manner of Example 2. This coating completed a 65-hour CFR engine test with unleaded gasoline and the test conditions of Example 1 virtually unchanged. The coated engine showed only 2.3 numbers of octane requirement increase (ORI) at 30 degrees of spark advance compared with 6.3 numbers of ORI for a test with the same heat without the coating.

EXAMPLE 4

A CFR L-head combustion chamber was spray-coated with a mixture prepared by blending 24 grams of Monsanto Skybond 700, 24 grams of Cancarb grade N-907 thermal carbon black, 24 grams of a mixture 26.5% NMP and 73.5% p-xylene in a high-speed blender. Seventy cc of treated Union Carbide BJO-0840 microballoons were added to 64 grams of the above blend along with 6 grams of the above NMP-p-xylene mixture. The microballoons were treated by heating them to 170° C. for 2 hours under 25 in. Hg of vacuum with a slow $N_2$ purge, then pressurizing the said microballoons to 400 psi under isooctane, floating off the uncrushed fraction, and drying the residual isooctane. The final blend was air-atomizer sprayed to a cured thickness of 0.005 inch. The coating was air-dried overnight, then oven-dried and cured for 2 hours at 50° C., 80° C., 120° C., 150° C., 180° C., 200° C., 220° C. and 240° C. The coating was unchanged after 100 hours of engine test with unleaded fuel, and the test conditions of Example 1.

EXAMPLE 5

For this example, a CFR L-head was milled to 9.5 compression ratio before coating. The coating mixture was prepared by ball milling: 31 grams of Monsanto Skybond 700, 23 grams of Monsanto Skybond 705, 21 grams of N-methyl-2-pyrrolidone, 1.2 grams of 95% pure, 0.3–1.5$\mu$ amorphous boron powder from Atomergic Chemetals, and 10 grams of No. 907 stainless-medium-thermal carbon black from Cancarb Limited. After milling was completed, 9.7 grams of Emerson and Cumings FTD 202 insoluble glass microspheres were added. The microspheres were classified by pressuring to 14,000k Pa under water and retaining the floating fraction. The cylinder head was preheated to 70° C. for spraying. The sprayed head was cured in a programmed oven which heated from 90° C. to 155° C. in 12 minutes, from 155° C. to 200° C. in 2 hours, and from 200° C. to 370° C. in 13 hours. The engine with the coated head ran for 20 hours at 2 inches of manifold vacuum with alkalate fuel. At the end of the test, the coating was generally intact except for a small area of high gas velocity between the cylinder and valves; elsewhere occasionally exposed microspheres showed evidence of thermal collapse on their exposed side. The average coating thickness at the start of test was 84.8 $\mu$m and 77.2 $\mu$m at the end of the test.

EXAMPLE 6

This example used the same engine and run conditions as Example 5. The matrix to hold the microspheres was prepared by ball milling: 21.3 grams Monsanto Skybond 705, 31.2 grams Monsanto Skybond 700, 10.9 No. 907 stainless-medium carbon black from Cancarb Limited, and 21.3 grams N-methyl-2-pyrrolidone. Sixty grams of this matrix was combined with 13.8 grams of Emerson and Cumings FA-A ceramic microballoons which had been sifted to remove microspheres larger than a 170 sieve and pressured to 15,000k Pa under water to remove weaker spheres. The coating was srayed on and cured in the same manner as Example 5. The coating remained intact during the 20-hour test with alkalate fuel with some coating deterioration occurring between the valve areas and the spark plug. During this run, average thickness changed from 102 $\mu$m at start of test to 89 $\mu$m at end of test. The used coating was run for an additional 20 hours with a deposit-forming mixture of unleaded gasoline with 25% FCC heavy component added. The coating kept the head substantially free of deposit. About of half the surface retained the white appearance due to zinc in the lube oil. All but a small area above the intake valve of the rest of the head had a tan appearance due to light deposits. (The microspheres were still clearly visible beneath it.) Normally, this fuel gives heavy black deposits over much of the head.

EXAMPLE 7

Two cylinder heads of a four-cylinder, overhead cam, 2.3 liter, production engine were spray-coated with a mixture prepared by blending 32.4 grams of Monsanto Skybond 700, 17.5 grams of Monsanto Skybond 705, 9.5 grams of Cancarb No. 907, a product of Cancarb Limited, thermal carbon black, and 22.2 grams of N-methyl-2-pyrrolidone, NMP, in a ball mill; then adding 70.4 grams of this blend to 8.2 grams of Emerson and Cumings FTF 15 glass microballoons which were pressure selected in water at 21,000k Pa. The cylinder head was preheated to 100° C. for spraying. The head was then cured by the cycle of Example 5. The engine operated for 230 hours on a mixed highwaysuburban driving cycle with a 29 mph average speed. At the end of this test, the two coated cylinders had an average ORI of 3.4 compared with an average ORI of 4.6 for the uncoated cylinders; this is a 1.2 ORI reduction for the coated cylinders.

Two specimens of the coating in this example had thermal conductivities of 0.171 and 0.118 J/m°Ksec, densities of 948 Kg/$M^3$ and estimated heat capacities of 1130 J/Kg°K. Thus, their $\sqrt{K\rho C}$ values were 428 and 356 J/$m^2$°Ksec$^{1/2}$, respectively. The specimen thicknesses were 40×10$^{-6}$ m and 50×10$^{-6}$ m, respectively, which give K/d values of 4275 and 2360 J/$m^2$°Ksec. The product of the thermal penetration and thermal conductance is 1.83×10$^6$ J$^2$/$m^4$°$K^2$sec$^{3/2}$ and 8.4×10$^5$ J$^2$/$m^4$°$K^2$sec$^{3/2}$, respectively.

For comparison, a combustion chamber from unleaded gasoline deposit had a thermal conductivity of 0.25, a density of 1520 kg/$m^3$ and a heat capacity of 1670 which gave a $\sqrt{K\rho C}$ of 797 J/$m^2$°Ksec$^{1/2}$. This particular deposit was 35×10$^{-6}$ m thick (although deposits of above 100×10$^{-6}$ m are more common) so that its K/d was 7143 J/$m^2$°Ksec.

I claim:

1. In an internal combustion engine comprising a combustion chamber having a surface exposed to combustion, the improvement which comprises at least a portion of said surface, having a combination of a thermal conductance and a thermal penetration which permits the temperature of said surface during the combustion process to be in excess of the temperature at which deposits form, said surface storing insufficient heat to substantially raise the temperature of the incoming air-fuel charge during the engine intake stroke and compression stroke, wherein said surface portion has a thermal penetration expressed as $\sqrt{K\rho C}$ of less than about 600 J/$m^2$°Ksec$^{1/2}$, and a thermal conductance expressed as K/d of at least about 2000 J/$m^2$°Ksec, and the product of the thermal penetration times thermal conductance is less than about 3×10$^6$ J$^2$/$m^4$°$K^2$sec$^{3/2}$, and said surface portion is a thermally stable, resinous syntactic foam comprising about 40 to 70% volume of inorganic, hollow microspheres, in a matrix comprising a composite of at least five of the group consisting of:
   (a) polyimide resin;
   (b) carbon;
   (c) silica; and
   (d) at least any two of the group consisting of boron, aluminum, and the oxides, nitrides, and carbides of silicon, titanium, chromium, tantalum, niobium, and zinc.

2. The internal combustion engine of claim 1 wherein said microspheres are composed of one of the group of glass, quartz and mixtures thereof.

3. The combustion chamber according to claim 1 wherein said foam comprises 30 to 85 weight percent of polyimide resin, about 70 to 15 weight percent of carbon black, and about 50 to 80 volume percent based on cured foam of hollow microspheres.

4. The combustion chamber according to claim 1 wherein said resinous syntactic foam is a ceramic insulator foam.

5. The internal combustion engine according to claim 1 wherein said surface is a coating applied to the interior surface of said internal combustion chamber.

6. An internal combustion engine as claimed in claim 1 wherein said matrix of said syntactic foam is composed of about 30 to 60 weight percent of polyimide resin, about 70 to 40 weight percent carbon black, and from greater than 0 weight percent to about 7 weight percent fumed silica, mixed with about 68 volume percent, based on the cured foam, of phenol-formaldehyde plastic microspheres of average diameter of about 0.03 mm to 0.08 mm.

7. In a combustion chamber valve suitable for use in an internal combustion engine, the improvement comprising at least a portion of said valve coated with the syntactic foam as claimed in claim 1.

8. In a combustion chamber valve as claimed in claim 7 wherein said portion of said valve includes the face and the tulip portion of said valve.

9. The internal combustion engine of claim 1 wherein said resinous foam comprises plastic microspheres in the resinous matrix.

10. The internal combustion engine of claim 9 wherein said plastic microspheres are composed of a phenol-formaldehyde plastic.

11. The internal combustion engine of claim 10 wherein said plastic microspheres are of about 0.01 mm to 0.1 mm average diameter and are present in said foam in an amount from about 50 to about 70 volume percent.

* * * * *